United States Patent
Li et al.

(10) Patent No.: US 12,537,408 B2
(45) Date of Patent: Jan. 27, 2026

(54) MOTOR STATOR AND MOTOR

(71) Applicant: Schaeffler Technologies AG & Co. KG, Herzogenaurach (DE)

(72) Inventors: Zhihao Li, Shanghai (CN); Xiangyang Li, Shanghai (CN); Sen Shu, Shanghai (CN); Mingzhe Li, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 350 days.

(21) Appl. No.: 18/268,658

(22) PCT Filed: Dec. 28, 2020

(86) PCT No.: PCT/CN2020/140212
§ 371 (c)(1),
(2) Date: Jun. 21, 2023

(87) PCT Pub. No.: WO2022/140926
PCT Pub. Date: Jul. 7, 2022

(65) Prior Publication Data
US 2024/0297545 A1    Sep. 5, 2024

(51) Int. Cl.
*H02K 3/28* (2006.01)
*H02K 1/16* (2006.01)

(52) U.S. Cl.
CPC .............. *H02K 3/28* (2013.01); *H02K 1/16* (2013.01); *H02K 2213/03* (2013.01)

(58) Field of Classification Search
CPC .. H02K 3/04; H02K 3/12; H02K 3/14; H02K 3/28

USPC ................................ 310/179, 180, 195, 207
See application file for complete search history.

(56) References Cited

U.S. PATENT DOCUMENTS 12,160,148 B2 * 12/2024 Balliett ................. H02K 3/28
2016/0285334 A1 * 9/2016 Turnbull ................ H02K 3/50

FOREIGN PATENT DOCUMENTS

| CN | 108539891 | 9/2018 |
|---|---|---|
| CN | 108880048 | 11/2018 |
| CN | 109451775 | 3/2019 |
| CN | 111446797 | 7/2020 |
| CN | 112087071 | 12/2020 |
| GB | 190426171 | 10/2005 |

* cited by examiner

*Primary Examiner* — Oluseye Iwarere
*Assistant Examiner* — Minki Chang
(74) *Attorney, Agent, or Firm* — Volpe Koenig

(57) ABSTRACT

A motor stator having stator windings as polyphase windings wound onto a stator core. The winding is continuously wound in a wave shape with 2N winding layers, S winding phases, and 2P poles of each phase winding. 4×S×P slots are formed in the core. Each pole of each phase has two conducting wire groups, each group has two conducting wires wound in parallel in adjacent slots, and the pitch of each conducting wire group is a normal pitch of y, a jumper pitch of y+1, and a dislocation pitch. The jumper pitch has a first pitch of y−1 and a second pitch of y+1. The dislocation pitch has a third pitch of y and a fourth pitch of y+2. One jumper pitch is used for each conducting wire group at every P−1 non-jumper pitch. One dislocation pitch is used for each conducting wire group between at least two adjacent layers.

20 Claims, 1 Drawing Sheet

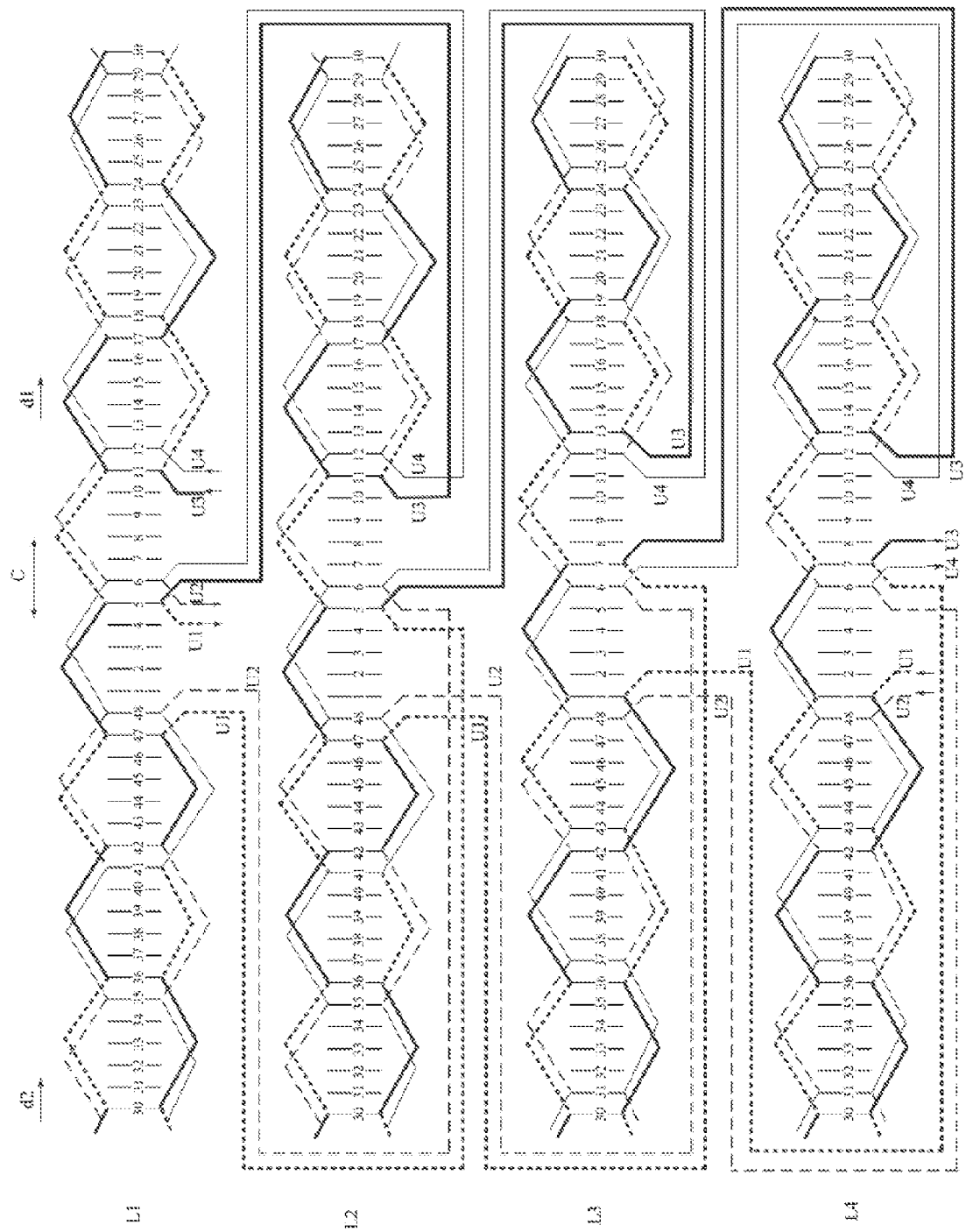

MOTOR STATOR AND MOTOR

CROSS-REFERENCE TO RELATED APPLICATIONS

This application is the U.S. National Phase of PCT Appln. No. PCT/CN2020/140212, filed Dec. 28, 2020, the entire disclosure of which is incorporated by reference herein.

TECHNICAL FIELD

The present disclosure relates to the field of motors, and in particular, to a stator winding, a motor stator and a motor.

BACKGROUND ART

In a scheme, for example, where a motor winding is formed by winding flat wires, the general winding methods include wave winding, U-shaped (also called U-pin or Hair-pin) winding and I-shaped (also called I-pin) winding.

The U-shaped winding needs to be welded at one end, and the I-shaped winding needs to be welded at two ends. The quality of welding spots affects the life of the motor. The more the welding spots, the lower the reliability of the motor and the higher the failure rate. In addition, the winding process of U-shaped winding and I-shaped winding is largely limited by the automation of machines, which limits the flexibility of design of the windings. For example, it is difficult to provide a winding design suitable for various motor specifications.

Compared with the U-shaped winding and the I-shaped winding, the wave winding is convenient to produce, has fewer welding spots on the wires, and enables the output torque of the motor to have less fluctuation and the motor to have good NVH performance. However, continuous wave windings may also bring another problem. That is, improper use of the pitch may result in uneven distribution of each phase winding, and result in an increase in the harmonic component in the no-load back electromotive force. The above harmonic component may increase the fluctuation of the output torque of the motor, thus causing noise.

SUMMARY

The present i disclosure aims to overcome or at least ameliorate the foregoing disadvantages of the prior art, and provides a motor stator and a motor.

According to a first aspect of the present disclosure, a motor stator is provided, which includes a stator core and a stator winding. The stator winding includes a plurality of phase windings wound around the stator core. Wires of the windings are continuously wound in undulation in a circumferential direction of the stator core. The wires are wound for 2N layers, the number of phases of the windings is S, the number of poles of each phase winding is 2P, and N, S and P are positive integers, wherein 4×S×P slots are defined in the stator core, the winding of each pole of each phase includes two wire groups, and each wire group includes two wires wound in parallel in adjacent slots.

Pitches of each wire group during winding include a normal pitch, a jumper pitch and a dislocation pitch. The jumper pitch includes a first pitch and a second pitch. The dislocation pitch includes a third pitch and a fourth pitch.

The normal pitch is y, the first pitch is y−1, the second pitch is y+1, the third pitch is y, the fourth pitch is y+2, and y is a positive integer greater than 2.

For each wire group, one jumper pitch is used after every P−1 non-jumper pitches. The non-jumper pitch includes the normal pitch and the dislocation pitch. For each wire group, one dislocation pitch is used between two normal pitches at a junction of at least one pair of adjacent layers, and the remaining pitches of each wire group are the normal pitch.

Both the jumper pitch and the dislocation pitch enable the two wires in the same wire group to exchange sequence in a winding direction along the circumferential direction.

In at least one embodiment, the adjacent layers are an Nth layer and an (N+1)th layer.

In at least one embodiment, in the winding direction along the circumferential direction, the jumper pitch used by the wire in the slot which is the front one in the winding direction is the first pitch, and the jumper pitch used by the wire in the slot which is the rear one in the winding direction is the second pitch.

In at least one embodiment, in the winding direction along the circumferential direction, the dislocation pitch used by the wire in the slot which is the front one in the winding direction is the third pitch, and the dislocation pitch used by the wire in the slot which is the rear one in the winding direction is the fourth pitch.

In at least one embodiment, y is equal to a pole pitch.

In at least one embodiment, the value S of the number of phases is equal to 3.

In at least one embodiment, the number of poles is 8, and P=4.

In at least one embodiment, the number of layers is 4, and N=2.

In at least one embodiment, each wire is an intact wire with no intermediate connection point in a winding path.

In at least one embodiment, the wires are flat wires.

According to a second aspect of the present disclosure, a motor is provided, which includes a stator, wherein the stator is the stator according to the present disclosure.

The stator winding of the motor according to the present i disclosure is wavy, which greatly reduces the number of welding spots, improves the reliability of the windings, and increases the flexibility of design of the windings. In addition, the short pitch is used during the winding process of the windings, so that the harmonic component in the no-load back electromotive force is reduced.

The stator and the motor according to the prevent disclosure have high reliability and can provide a larger power density.

BRIEF DESCRIPTION OF THE DRAWINGS

FIG. 1 shows a schematic diagram of a winding method of one phase winding according to an embodiment of the present disclosure.

DESCRIPTION OF REFERENCE NUMERALS

C circumferential direction; L1 first layer; L2 second layer; L3, third layer; L4 fourth layer.

DETAILED DESCRIPTION

Exemplary embodiments will be described below with reference to the attached drawings. It should be understood that these specific descriptions are only used to teach those skilled in the art how to implement the present disclosure, and are neither intended to be exhaustive of all possible variations of the present disclosure nor to limit the scope of the present disclosure.

Taking a three-phase motor (that is, the number of phases S=3) as an example, a motor and a motor stator according to the present disclosure are described with reference to FIG. 1.

The stator includes a stator core and a stator winding. In this embodiment, 48 slots are defined in the stator core, and the FIGURE shows a schematic diagram of the 48 slots unfolded in a circumferential direction C. The number of poles 2P formed by the stator winding is 8, that is, the number of pole pairs P=4. The corresponding number of slots of each pole of each phase is 2.

According to the basic knowledge of windings, a corresponding pole pitch of the above winding y=6. According to the present disclosure, the winding is wound by a short-pitch method, so that a part of the pitches are smaller than the pole pitch. Moreover, during the winding process, the winding method of combining the normal pitch with the jumper pitch and the dislocation pitch is used, so that the harmonic component in the no-load back electromotive force is reduced.

The FIGURE illustrates how to wind one phase (U-phase, V-phase or W-phase, also called A-phase, B-phase or C-phase) winding of a three-phase motor according to an embodiment of the present disclosure. Each phase winding includes four wires. The four wires form two wire groups, and each wire group includes two wires. The currents in each wire group flow in a same direction, and the currents in the two wire groups of each phase flow in opposite directions. Arrows below the wires in the FIGURE show the flow directions of the currents in the wires. The winding rule for each phase winding is the same, except that initial winding slots for each phase winding are different, so that different slots are used by different phase windings.

Taking one phase winding (such as the U-phase winding) as an example, the winding rule of the windings according to the present disclosure is described.

FIG. 1 is a schematic diagram showing 48 slots unfolded along the circumferential direction (C) of the stator core. A vertical line where each serial number is located in the FIGURE represents a slot. For convenience of illustration, the slot at the unfolded position is showed twice respectively at the beginning and the end of the unfolded diagram (that is, the slot 30 is showed twice).

In this embodiment, the wires of each phase is wound in a radial direction of the stator core for four layers, which are the first layer L1, the second layer L2, the third layer L3 and the fourth layer L4. It should be noted that two groups of wires (corresponding to the wires represented by both the solid line and the dotted line in each slot in the FIGURE) need to be provided for the reverse flow of currents in each layer. Therefore, in fact, each layer further includes two wire layers, that is, eight wires are stacked radially in each slot in this embodiment. For convenience of description, the eight wires are divided into the above four wire layers herein.

In the FIGURE, the wire U1 and the wire U2 form one wire group, and the wire U3 and the wire U4 form the other wire group. The two wires in each wire group are wound in parallel in adjacent slots during each step of the winding process. Since the winding rules of the two wire groups are the same, the wire group formed by the wire U3 and the wire U4 is taken as an example for description.

Observing from the first layer L1, the wire U3 and the wire U4 respectively start from the slot 11 and the slot 12, and advance in the circumferential direction C of the stator core as indicated by the arrow d1. After the wire U3 reaches the rightmost slot 30 in the FIGURE, the observation is turned to the leftmost slot 30 in the FIGURE, and the wire U3 and the wire U4 continue advancing in the circumferential direction C of the stator core as indicated by the arrow d2. After the wires are wound in the circumferential direction C of the stator core for a full circle, the wires continue to wind in the second layer L2. Then, the above observation method is further used to observe the advancing direction of the wires in the subsequent layer.

Pitches of the wires during the winding process include a normal pitch, a jumper pitch and a dislocation pitch.

In this embodiment, one jumper pitch is used after every three normal pitches. One dislocation pitch is used between (at the junction of the two layers) the Nth layer and the (N+1)th layer (that is, the second layer L2 and the third layer L3).

Every time the jumper pitch or the dislocation pitch is used, the two wires in one wire group exchange sequence in the winding direction along the circumferential direction C, that is, for example, before the jumper pitch or the dislocation pitch is used, in the winding direction along the circumferential direction C (that is, the directions indicated by arrows d1 and d2 in the FIGURE), the wires wound at normal pitches in each step in adjacent slots satisfy: after one jumper pitch or one dislocation pitch, the wire U4 which is the formerly front one becomes the rear one, and the wire U3 which is the formerly rear one becomes the front one.

Specifically, the normal pitch=the pole pitch y=6.

The jumper pitch includes a first pitch and a second pitch. The first pitch is 5 (that is, y−1), and the second pitch is 7 (that is, y+1).

When the jumper pitch is used, the front wire in the winding direction is wound at the first pitch, and the rear wire in the winding direction is wound at the second pitch, so that the front wire and the rear wire exchange sequence in the winding direction after the jumping winding.

The winding of the wire U3 and the wire U4 starting from the slot 11 and the slot 12 of the first layer is taken as an example for detailed description.

During the winding of the wire U3 in the first layer L1, the wire U3 is sequentially wound through the slots in the order of: 11→17→24→30→36→42→47→5, and the used pitches are: 6 (17−11), 7 (24−17), 6 (30−24), 6 (36−30), 6 (42−36), 5 (47−42), 6 (5+48−47).

After that, the wire U3 is wound from the slot 5 of the first layer L1 to the slot 11 of the second layer L2, and is further wound in the second layer L2. The wire U3 is sequentially wound through the slots in the order of: 5 (L1)→11 (L2)→17→24→30→36→42→47→5 (L2), and the used pitches are: 6, 6, 7, 6, 6, 6, 5, 6, wherein the first pitch of 6 is the pitch used between the first layer L1 and the second layer L2, and the selection of this pitch follows the previous pitch selection rule (in the first layer L1), that is, the pitch is the second normal pitch used after the previous jumper pitch.

During the winding of the wire U4 in the first layer L1, the wire U4 is sequentially wound through the slots in the order of: 12→18→23→29→35→41→48→6, and the used pitches are: 6, 5, 6, 6, 6, 7, 6.

After that, the wire U4 is wound from the slot 6 of the first layer L1 to the slot 12 of the second layer L2, and is further wound in the second layer L2. The wire U4 is sequentially wound through the slots in the order of: 6 (L1)→12 (L2)→18→23→29→35→41→48→6, and the used pitches are: 6, 6, 5, 6, 6, 6, 7, 6, wherein the first pitch of 6 is the pitch used between the first layer L1 and the second layer L2, and the selection of this pitch follows the previous pitch selection rule (in the first layer L1), that is, the pitch is the second normal pitch used after the previous jumper pitch.

The dislocation pitch includes a third pitch and a fourth pitch. The third pitch is equal to the normal pitch, that is, the third pitch is 6 (that is, y), and the fourth pitch is 8 (that is, y+2).

When the dislocation pitch is used, the front wire in the winding direction is wound at the third pitch, and the rear wire in the winding direction is wound at the fourth pitch, so that the front wire and the rear wire exchange sequence in the winding direction after the dislocation winding.

For example, at the junction between the second layer L2 and the third layer L3, tail ends of the wire U3 and the wire U4 in the winding direction of the second layer L2 are respectively located in the slot 5 and the slot 6. The two wires enter the third layer L3 at the dislocation pitch. Since the wire U4 is located in front of the wire U3 before the dislocation pitch, the wire U4 is wound through the slot 12 of the third layer L3 at the third pitch of 6. Since the wire U3 is located behind the wire U4, the wire U3 is wound through the slot 13 of the third layer L3 at the fourth pitch of 8.

The winding of the third layer L3 and the fourth layer L4 follows the previous winding rule, that is, one jumper pitch is used after every three normal pitches, so that the two wires in one wire group exchange sequence in the winding direction along the circumferential direction C.

It should be noted that the use of the dislocation pitch breaks the rule of "using one jumper pitch after every three normal pitches", but the above rule is still followed after the dislocation pitch. For this exception, the dislocation pitch may be regarded as the normal pitch, or more rigorously, the rule is revised to: using one jumper pitch after every three non-jumper pitches. The non-jumper pitches include the normal pitch and the dislocation pitch. Preferably, the dislocation pitch is used between the Nth layer and the (N+1)th layer.

It should be understood that in other possible embodiments, the dislocation pitch may be used between other adjacent layers (not limited to the Nth layer and the (N+1)th layer).

It should be understood that the winding method of the other two phase windings is similar to the winding method of the U-phase in FIG. 1, except that the used slots are different (due to the different starting slots), which is not described in detail in the present disclosure.

Preferably, the wires of the windings according to the present disclosure are flat wires, more preferably flat copper wires. The filling rate of the slot can reach 60% or more by using the flat wire.

Preferably, each of the four wires of each phase according to the present disclosure is an intact wire with no splicing and welding spot in a winding path. Therefore, the reliability of the windings is enhanced, and the winding failure caused by damage to the intermediate welding spot is not likely to occur. Moreover, in actual production, considering various reasons, it is also possible to use multiple wires which are connected end to end to form a longer wire.

In an embodiment, the four wires of each phase according to the present disclosure may be connected in series, in parallel or in series-parallel. The three phase windings may be connected into a delta or star shape.

It should be understood that in the case where two slots are provided for each pole of each phase, the number of poles of each phase, the number of slots of the stator core, and the number of layers of the winding (which needs to be an even number) are not limited by the present disclosure.

It should be understood that the present disclosure further provides a motor including the above stator.

Some of the beneficial effects of the above-mentioned embodiments of the present disclosure are briefly described hereinafter.

(i) The wires are continuously wound in undulation, which greatly reduces the number of welding spots, increases the reliability of the windings and prolongs the life of the motor. The design of the windings is more flexible, and the winding parameters can be adjusted as required while following the winding rule, so that the motor can adapt to different power requirements.

(ii) During the winding process, the pitches of the windings periodically change multiple times (that is, non-normal pitch is used), and the positions of pitch varying in circumferential direction C are even. For example, the pitch changes once after every 180 degrees (that is, every four poles). The circumferentially even and high-frequency pitch variation reduces the harmonic component in the no-load back electromotive force, so that the waveform of the no-load back electromotive force approximates a sinusoidal curve more closely, thus reducing the fluctuation of the output torque of the motor and reducing noise.

It should be understood that the above-mentioned embodiments are exemplary only and are not intended to limit the present disclosure. Those skilled in the art can make various modifications and changes to the above-mentioned embodiments according to the teaching of the present disclosure without departing from the scope of the present disclosure.

The invention claimed is:

1. A motor stator, comprising:
a stator core and a stator winding, the stator winding comprises a plurality of phase windings wound around the stator core, wires of the windings are continuously wound in undulation in a circumferential direction of the stator core, the wires are wound for 2N layers, a number of phases of the windings is S, a number of poles of each said phase winding is 2P, and N, S and P are positive integers;
4×S×P slots are defined in the stator core, the winding of each said pole of each said phase comprises two wire groups, and each said wire group comprises two of the wires wound in parallel in adjacent ones of the slots;
pitches of each said wire group during winding comprise a normal pitch, a jumper pitch and a dislocation pitch, the jumper pitch comprises a first pitch and a second pitch, and the dislocation pitch comprises a third pitch and a fourth pitch,
the normal pitch is y, the first pitch is y−1, the second pitch is y+1, the third pitch is y, the fourth pitch is y+2, and y is a positive integer greater than 2;
wherein for each said wire group, one said jumper pitch is used after every P−1 non-jumper pitches, the non-jumper pitch comprises the normal pitch and the dislocation pitch, and for each said wire group, one said dislocation pitch is used between two normal of the pitches at a junction of at least one pair of adjacent layers, and the remaining pitches of each said wire group are the normal pitch; and
both the jumper pitch and the dislocation pitch enable the two wires in a same one of the wire groups to exchange sequence in a winding direction along the circumferential direction.

2. The motor stator according to claim 1, wherein the at least one pair of adjacent ones of the layers are an Nth layer and an (N+1)th layer.

3. The motor stator according to claim 1, wherein in the winding direction along the circumferential direction, the jumper pitch used by the wire in the slot which is a front one in the winding direction is the first pitch, and the jumper pitch used by the wire in the slot which is a rear one in the winding direction is the second pitch.

4. The motor stator according to claim 1, wherein in the winding direction along the circumferential direction, the dislocation pitch used by the wire in the slot which is a front one in the winding direction is the third pitch, and the dislocation pitch used by the wire in the slot which is a rear one in the winding direction is the fourth pitch.

5. The motor stator according to claim 1, wherein y is equal to a pole pitch.

6. The motor stator according to claim 1, wherein the value S of the number of phases is equal to 3.

7. The motor stator according to claim 1, wherein the number of poles is 8, and P=4.

8. The motor stator according to claim 1, wherein the number of layers is 4, and N=2.

9. The motor stator according to claim 1, wherein each said wire is an intact wire with no intermediate connection point in a winding path.

10. The motor stator according to claim 1, wherein the wires are flat wires.

11. A motor, comprising the motor stator according to claim 1.

12. A motor stator, comprising:
a stator core and a stator winding, the stator winding comprises a plurality of phase windings wound around the stator core, wires of the windings are continuously wound in undulation in a circumferential direction of the stator core, the wires are wound for 2N layers, a number of phases of the windings is S, a number of poles of each said phase winding is 2P, and N, S and P are positive integers;
4×S×P slots are defined in the stator core, the winding of each said pole of each said phase comprises two wire groups, and each said wire group comprises two of the wires wound in parallel in adjacent ones of the slots;
pitches of each said wire group during winding comprise a normal pitch, a jumper pitch and a dislocation pitch, the jumper pitch comprises a first pitch and a second pitch, and the dislocation pitch comprises a third pitch and a fourth pitch, the normal pitch is y, the first pitch is y−1, the second pitch is y+1, the third pitch is y, the fourth pitch is y+2, and y is a positive integer greater than 2;
wherein for each said wire group, one said jumper pitch is used after every P−1 non-jumper pitches, the non-jumper pitch comprises the normal pitch and the dislocation pitch, and for each said wire group, one said dislocation pitch is used between two normal of the pitches at a junction of at least one pair of adjacent layers; and
the two wires in a same one of the wire groups exchange sequence in a winding direction along the circumferential direction via the jumper pitch and the dislocation pitch.

13. The motor stator according to claim 12, wherein the at least one pair of adjacent ones of the layers are an Nth layer and an (N+1)th layer.

14. The motor stator according to claim 12, wherein in the winding direction along the circumferential direction, the jumper pitch used by the wire in the slot which is a front one in the winding direction is the first pitch, and the jumper pitch used by the wire in the slot which is a rear one in the winding direction is the second pitch.

15. The motor stator according to claim 12, wherein in the winding direction along the circumferential direction, the dislocation pitch used by the wire in the slot which is a front one in the winding direction is the third pitch, and the dislocation pitch used by the wire in the slot which is a rear one in the winding direction is the fourth pitch.

16. The motor stator according to claim 12, wherein y is equal to a pole pitch.

17. The motor stator according to claim 12, wherein the value S of the number of phases is equal to 3.

18. The motor stator according to claim 12, wherein the number of poles is 8, and P=4.

19. The motor stator according to claim 12, wherein the number of layers is 4, and N=2.

20. The motor stator according to claim 12, wherein each said wire is an intact wire with no intermediate connection point in a winding path.

\* \* \* \* \*